(12) United States Patent
Thitsartarn et al.

(10) Patent No.: US 12,679,960 B2
(45) Date of Patent: Jul. 14, 2026

(54) MECHANICALLY-ENHANCED POLYOLEFIN COMPOSITE

(71) Applicants: Agency for Science, Technology and Research, Singapore (SG); Thai Polyethylene Co., Ltd., Bangkok (TH)

(72) Inventors: Warintorn Thitsartarn, Singapore (SG); Xikui Zhang, Singapore (SG); Jayven Chee Chuan Yeo, Singapore (SG); Chaobin He, Singapore (SG); Nopphawan Phonthammachai, Phichit (TH); Supakitt Treethammakul, Samutprakarn (TH); Tanapon Sukachonmakul, Bangkok (TH)

(73) Assignees: Agency for Science, Technology and Research (SG); Tai Polyethylene Co., Ltd. (TH)

( * ) Notice: Subject to any disclaimer, the term of this patent is extended or adjusted under 35 U.S.C. 154(b) by 1165 days.

(21) Appl. No.: 17/639,702

(22) PCT Filed: Sep. 4, 2020

(86) PCT No.: PCT/SG2020/050516
§ 371 (c)(1),
(2) Date: Mar. 2, 2022

(87) PCT Pub. No.: WO2021/045690
PCT Pub. Date: Mar. 11, 2021

(65) Prior Publication Data
US 2022/0298342 A1     Sep. 22, 2022

(30) Foreign Application Priority Data
Sep. 5, 2019    (SG) ........................... 10201908206U

(51) Int. Cl.
*C08K 7/14*      (2006.01)
*C08L 23/12*     (2006.01)
*C08L 51/06*     (2006.01)
*C08L 63/00*     (2006.01)

(52) U.S. Cl.
CPC ............... *C08L 23/12* (2013.01); *C08L 51/06* (2013.01); *C08L 63/00* (2013.01); *C08K 7/14* (2013.01)

(58) Field of Classification Search
CPC .. C08K 7/14; C08K 9/06; C08K 3/346; C08L 51/06; C08L 23/12
See application file for complete search history.

(56) References Cited

U.S. PATENT DOCUMENTS

| | | | | |
|---|---|---|---|---|
| 7,220,484 B2 * | 5/2007 | Ton-That | ............... | B82Y 30/00 |
| | | | | 428/407 |
| 2005/0261422 A1 | 11/2005 | Ton-That et al. | | |
| 2013/0261226 A1 | 10/2013 | Badali et al. | | |
| 2018/0155534 A1 * | 6/2018 | Kato | ....................... | C08L 67/02 |

FOREIGN PATENT DOCUMENTS

| | | |
|---|---|---|
| CN | 102002188 A | 4/2011 |
| CN | 102492222 A | 6/2012 |
| CN | 102952309 A | 3/2013 |
| CN | 103589052 A | 2/2014 |
| CN | 110003677 A | 7/2019 |
| WO | 1997011122 A1 | 3/1997 |
| WO | 2018031729 A1 | 2/2018 |

OTHER PUBLICATIONS

International Search Report for International Application No. PCT/SG2020/050516 dated Nov. 30, 2020, pp. 1-3.
Written Opinion of the International Searching Authority for International Application No. PCT/SG2020/050516 dated Nov. 30, 2020, pp. 1-6.
Office Action for Chinese Patent Application No. 2020800763321 dated May 19, 2023, pp. 1-9.
Office Action for Chinese Patent Application No. 2020800763321 dated Feb. 28, 2024, pp. 1-10.
Search Report for Chinese Patent Application No. 2020800763321 dated May 18, 2023, pp. 1-2.
Li et al., "Synergetic Effect of Epoxy Resin and Maleic Anhydride Grafted Polypropylene on Improving Mechanical Properties of Polypropylene/Short Carbon Fiber Composites," Composites: Part A, vol. 67, 2014, pp. 212-220.
J. L. Thomason, "Interfaces and Interfacial Effects in Glass Reinforced Thermoplastics," Proceedings of the 28th Risø International Conference on Materials Science, 2007, pp. 75-92.

* cited by examiner

*Primary Examiner* — Margaret G Moore
(74) *Attorney, Agent, or Firm* — Shackelford, McKinley & Norton, LLP

(57) ABSTRACT

A mechanically-enhanced polyolefin composite is provided. The mechanically-enhanced polyolefin composite comprises a matrix comprising a polyolefin, a polymer having a moiety grafted thereon, and a polymerisable linker, wherein the moiety grafted on the polymer is covalently bonded to the polymerisable linker via a chemical bond, and a filler disposed within the matrix. There is also provided a method of providing a polyolefin composite, comprising a matrix comprising a polyolefin, a polymer having a moiety grafted thereon, and a polymerisable linker, wherein the moiety grafted on the polymer is covalently bonded to the polymerisable linker via a chemical bond, and a filler disposed within the matrix, the method comprising (i) mixing a polyolefin, a polymer having a moiety grafted thereon, a polymerisable linker and a filler; (ii) melting the mixture of step (i); and (iii) kneading the mixture of step (ii).

18 Claims, 4 Drawing Sheets

| Sample | MPP (wt%) | Epoxy (wt%) | GF (wt%) | Clay (wt%) | Flexural | | Tensile | | Impact Strength (kJ/m²) |
| | | | | | Modulus (GPa) | Strength (MPa) | Modulus (GPa) | Strength (MPa) | |
|---|---|---|---|---|---|---|---|---|---|
| PP | 0 | 0 | 0 | 0 | 2.09 ± 0.04 | 46.70 ± 0.80 | 1.21 ± 0.05 | 26.10 ± 1.60 | 6.86 ± 0.41 |
| | 5 | 0 | 0 | 0 | 1.98 ± 0.09 | 46.30 ± 1.24 | 1.53 ± 0.03 | 28.40 ± 0.18 | 7.00 ± 0.26 |
| | 10 | 0 | 0 | 0 | 2.13 ± 0.06 | 50.92 ± 0.46 | 1.20 ± 0.12 | 25.45 ± 0.60 | 6.79 ± 0.31 |
| | | | | | | | | | |
| Example 1a | 5 | 5 | 20 | 0 | 4.32 ± 0.12 | 82.00 ± 1.70 | 3.55 ± 0.03 | 47.80 ± 0.40 | 5.68 ± 0.12 |
| Example 1b | 5 | 10 | 20 | 0 | 4.20 ± 0.11 | 83.60 ± 1.20 | 3.56 ± 0.01 | 48.50 ± 0.60 | 5.56 ± 0.17 |
| Example 1c | 10 | 5 | 20 | 0 | 3.46 ± 0.03 | 79.29 ± 1.34 | 3.27 ± 0.10 | 48.22 ± 0.51 | 6.44 ± 0.22 |
| Example 1d | 10 | 10 | 20 | 0 | 4.22 ± 0.18 | 87.30 ± 3.00 | 3.81 ± 0.03 | 51.50 ± 0.20 | 6.42 ± 0.40 |
| | | | | | | | | | |
| Example 2a | 5 | 5 | 0 | 5 | 2.48 ± 0.07 | 55.37 ± 0.48 | 1.41 ± 0.04 | 27.00 ± 0.19 | 5.18 ± 0.23 |
| Example 2b | 5 | 10 | 0 | 5 | 2.27 ± 0.04 | 52.02 ± 0.53 | 1.40 ± 0.06 | 25.02 ± 0.27 | 3.51 ± 0.25 |
| Example 2c | 10 | 5 | 0 | 5 | 2.37 ± 0.04 | 51.86 ± 0.49 | 1.46 ± 0.01 | 26.08 ± 0.05 | 4.91 ± 0.20 |
| Example 2d | 10 | 10 | 0 | 5 | 2.33 ± 0.07 | 58.84 ± 0.62 | 1.51 ± 0.04 | 30.04 ± 0.14 | 4.95 ± 0.19 |
| | | | | | | | | | |
| Example 3 | 10 | 10 | 30 | 0 | 6.50 ± 0.12 | 126.96 ± 0.55 | 5.79 ± 0.06 | 77.77 ± 1.05 | 8.76 ± 0.53 |
| | | | | | | | | | |
| Comparative 1a | 5 | 0 | 20 | 0 | 3.99 ± 0.07 | 72.30 ± 0.60 | 2.88 ± 0.07 | 40.90 ± 0.10 | 6.29 ± 0.51 |
| Comparative 1b | 0 | 5 | 20 | 0 | 3.07 ± 0.04 | 68.13 ±0.34 | 2.95 ± 0.11 | 38.62 ± 0.59 | 4.56 ± 0.12 |
| Comparative 2a | 5 | 0 | 0 | 5 | 2.17 ± 0.09 | 49.37 ± 1.44 | 1.32 ± 0.06 | 24.75 ± 0.61 | 4.19 ± 0.34 |
| Comparative 2b | 0 | 5 | 0 | 5 | 2.12 ± 0.03 | 48.78 ± 0.41 | 1.31 ± 0.05 | 24.07 ± 0.18 | 4.84 ± 0.25 |

FIG. 2

MECHANICALLY-ENHANCED POLYOLEFIN COMPOSITE

CROSS-REFERENCE TO RELATED APPLICATION

This application claims the benefit of priority of Singapore patent application no. 10201908206U filed on 5 Sep. 2019, the content of which is incorporated herein by reference in its entirety for all purposes.

TECHNICAL FIELD

Various embodiments relate to a mechanically-enhanced polyolefin composite and a method of preparing the mechanically-enhanced polyolefin composite, as well as application of the mechanically-enhanced polyolefin composite.

BACKGROUND

Polyolefins such as polypropylene (PP) and polyethylene (PE) may have been widely used as a common plastic in many applications. In order to expand the applications of polyolefins, their mechanical strength and thermal stability may need to be improved. Fabrication of a polyolefin as a polyolefin composite may be one of the traditional ways to enhance the polyolefin's performance. For example, many types of fillers and nano-fillers may be used for performance enhancement. However, one of the challenges may be the difficulty of forming a strong interface interaction between the filler and polyolefin, wherein the filler may usually be polar in nature while the polyolefin is typically non-polar. In addition, the filler also requires to be sufficiently dispersed throughout the matrix. Traditionally, modified PP, such as anhydride grafted PP (for example, maleic anhydride-grafted polypropylene, abbreviated as MPP), may be used to enhance the polarity of PP for improved compatibility with fillers and/or other components. However, this approach tends not to yield satisfying results, since the interaction between, for example, MPP and the remaining matrix components tends to be limited to secondary interaction such as hydrogen bonding.

Hence, there remains a need for an improved polyolefin composite and a method of preparing the polyolefin composite that address or at least alleviate one or more of the above-mentioned problems.

SUMMARY

In a first aspect, there is provided a polyolefin composite comprising a matrix comprising a polyolefin, a polymer having a moiety grafted thereon, and a polymerisable linker, wherein the moiety grafted on the polymer is covalently bonded to the polymerisable linker via a chemical bond, and a filler disposed within the matrix.

In a second aspect, there is provided a method of providing a polyolefin composite, comprising a matrix comprising a polyolefin, a polymer having a moiety grafted thereon, and a polymerisable linker, wherein the moiety grafted on the polymer is covalently bonded to the polymerisable linker via a chemical bond, and a filler disposed within the matrix, the method comprising (i) mixing a polyolefin, a polymer having a moiety grafted thereon, a polymerisable linker and a filler; (ii) melting the mixture of step (i); and (iii) kneading the mixture of step (ii).

In a third aspect, there is provided a polyolefin composite provided by the method as defined in the second aspect.

In a fourth aspect, there is provided use of a polyolefin composite as defined in the first aspect or in the third aspect in transportation, infrastructure, consumer goods, and/or construction.

BRIEF DESCRIPTION OF THE DRAWINGS

The invention will be better understood with reference to the detailed description when considered in conjunction with the non-limiting examples and the accompanying drawings, in which:

FIG. 2 is a table showing polyolefin composites in accordance with the present disclosure and comparative examples, and a comparison of their mechanical properties.

DETAILED DESCRIPTION

Figure 1:
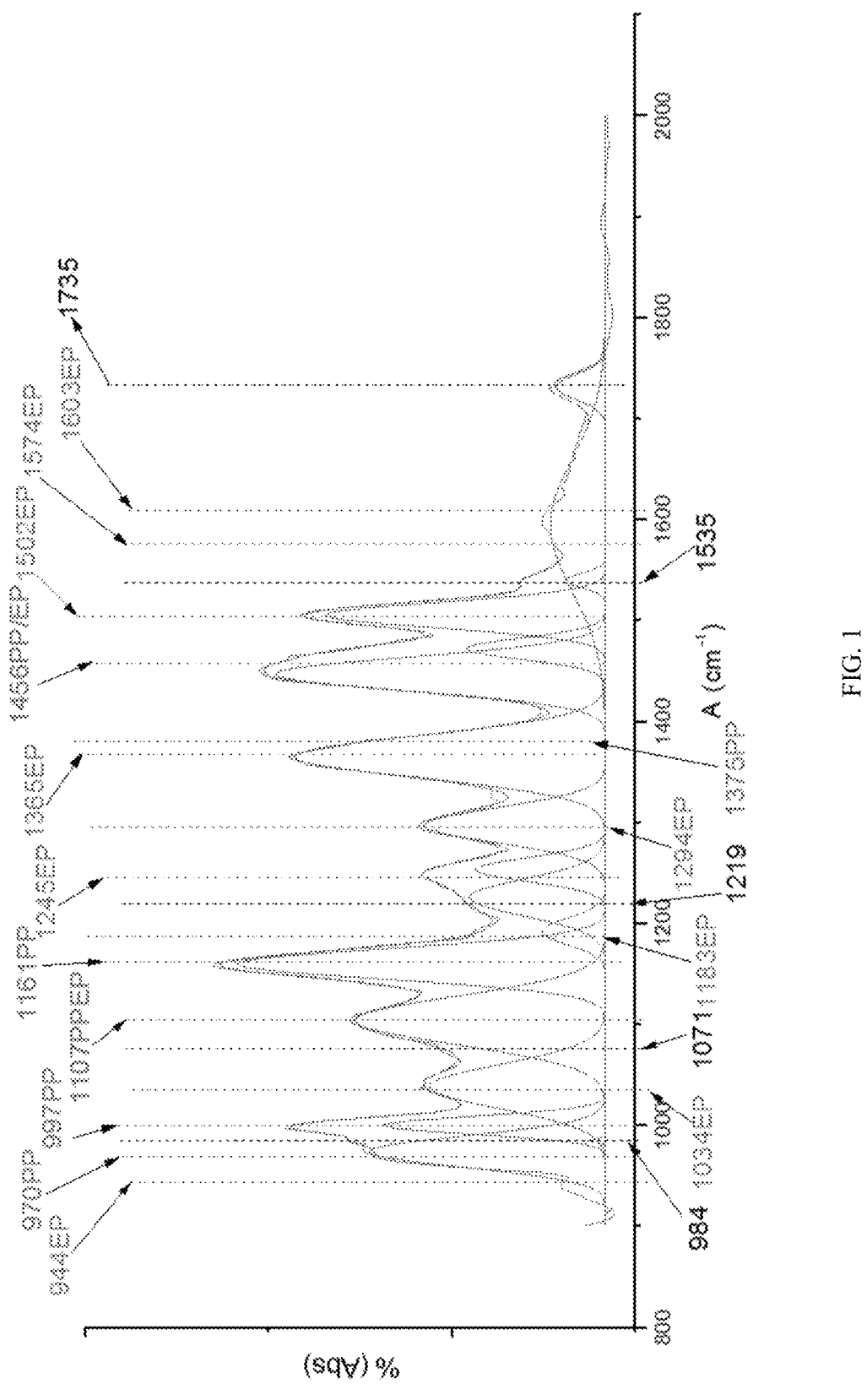
FIG. 1 is an infrared (IR) spectrum of a polyolefin composite in accordance with the present disclosure.

Various embodiments disclosed herein are directed to a mechanically-enhanced polyolefin composite. In its broadest sense, the polyolefin composite of the present disclosure may comprise a matrix. The matrix may comprise a polyolefin, a polymer having a moiety grafted thereon, and a polymerisable linker. The moiety grafted on the polymer may be covalently bonded to the polymerisable linker via a chemical bond. Moreover, a filler may be disposed within the matrix.

Accordingly, in a first aspect, there is provided a matrix comprising a polyolefin, a polymer having a moiety grafted thereon, and a polymerisable linker, wherein the moiety grafted on the polymer is covalently bonded to the polymerisable linker via a chemical bond, and a filler disposed within the matrix.

Advantageously, the combination of a polymer having a moiety grafted thereon, and a polymerisable linker, both connected via a covalent bond, provides a strongly bonded interface between the polyolefin and the filler within the matrix, while maintaining a high dispersion of the filler within the polyolefin composite. The strongly bonded interface is rendered by a covalent bond between the polymer having a moiety grafted thereon, and the polymerisable linker, whereby each of them may have a strong interaction with the polyolefin and the filler, respectively. In particular, the polyolefin may have a strong hydrophobic interaction with the polymer having a moiety grafted thereon, and the polymerisable linker may have a strong hydrophilic interaction, or even covalent bond, with the filler. Accordingly, the polymer having a moiety grafted thereon, and the polymerisable linker, due to their covalent bonding, binds the polyolefin to the fillers despite the difference in polarity between the polyolefin and the filler. This connection established using the polymer having a moiety grafted thereon and the polymerisable linker results in a polyolefin composite with an improved compatibility between the polyolefin and the filler, which in turn significantly enhances mechanical strength and toughness.

The use of the polymer having a moiety grafted thereon, and the polymerisable linker, whereby the moiety grafted on the polymer is covalently bonded to the polymerisable linker via a chemical bond, therefore possesses advantages over existing technologies wherein modified PP, such as anhydride grafted PP (for example, MPP), was used to enhance the polarity of PP, since those technologies only rely on secondary interactions for compatibility between the various components. The combined use of a polymer having a moiety grafted thereon, and a polymerisable linker, whereby the moiety grafted on the polymer is covalently bonded to the polymerisable linker to compatibilize the polyolefin with the filler, provides a synergistic effect. Not only a high mechanical enhancement of the polyolefin composite was observed, but at the same time, the dispersion of the filler within the matrix was observed to be sufficiently satisfying. This synergistic effect may be based on the covalent interaction between the polymer having a moiety grafted thereon, and the polymerisable linker, which serves to form a bridge overcoming the polarity differences between the substantially non-polar polyolefin and the substantially polar filler. Said differently, the polymer having the moiety grafted thereon and the polymerisable linker are covalently bonded to form a moiety that advantageously bridges the significant difference in polarity of the polyolefin and the filler so as to adhere the polyolefin within the matrix to the filler.

In various embodiments, the polyolefin may interact hydrophobically with the polymer having the moiety grafted thereon. However, the polyolefin does not chemically react with the polymer having a moiety grafted thereon, the polymerisable linker and the filler. In other words, the polyolefin may not form a covalent bond with any other component. Typically, a polyolefin is a non-polar, or hydrophobic material. The polyolefin may be an unsubstituted polyolefin. For example, the polyolefin may be an unsubstituted polyolefin, which only includes a polymeric backbone formed from polymerizing monomers of the polyolefin without any additional moieties grafted thereon.

According to various embodiments, the polyolefin may be selected from the group consisting of a polymer or a random copolymer or a block copolymer of a $C_{2-20}$alkylene, a $C_{4-20}$alkyldiene, a $C_{6-20}$alkyltriene, a $C_{3-20}$cycloalkylene, a $C_{4-20}$cycloalkyldiene, a $C_{5-20}$cycloalkyltriene, a $C_{8-20}$phenylalkylene, and a combination thereof. In various embodiments, the polyolefin may be selected from the group consisting of a polymer or a random copolymer or a block copolymer of ethylene, propylene, 1-pentene, 1-butene, 4-methyl-1-pentene, 1-hexene, 1-octene, 1-decene, styrene, ethylidene norbornene, 1,4-hexadiene, 1,5-hexadiene, 1,7-octadiene, 1,9-decadiene, dicyclopentadiene and ethylene-propylene-diene monomer. In certain embodiments, the polyolefin may be polyethylene. In certain embodiments, the polyolefin may be polypropylene, optionally in combination with a plastomer and/or elastomer, optionally selected from an ethylene-$\alpha$-olefin copolymer. In a non-limiting example, the polyolefin is polypropylene. Advantageously, a polyolefin composite comprising polypropylene may have the potential to replace engineering plastic.

In present context, the term "alkylene", alone or in combination, refers to an aliphatic hydrocarbon having one carbon-carbon double-bond. The alkylene may be linear or branched. In certain embodiments, an alkylene comprises 2 to 20 carbon atoms, such as 2 to 18, or 2 to 12, or 2-6 carbon atoms. "$C_{2-20}$alkylene" means that an alkenyl group comprises only 2 carbon atoms, 3 carbon atoms, 4 carbon atoms, 5 carbon atoms, 6 carbon atoms, 7 carbon atoms, 8 carbon atoms, 9 carbon atoms, 10 carbon atoms, 11 carbon atoms, 12 carbon atoms, 13 carbon atoms, 14 carbon atoms, 15 carbon atoms, 16 carbon atoms, 17 carbon atoms, 18 carbon atoms, 19 carbon atoms, or 20 carbon atoms. Examples of alkylenes include, but are not limited to, ethenyl, propenyl, butenyl, 1,4-butadienyl, pentenyl, hexenyl, 4-methylhex-1-enyl, 4-ethyl-2-methylhex-1-enyl and the like.

The term "linear", as used herein, refers to each of the carbon atom backbone chains having no branch point. The term "branched" means a chain of atoms with one or more side chains attached to it. Branching occurs by the replacement of a substituent, e.g. a hydrogen atom, with a covalently bonded substituent or moiety, e.g. an alkyl group.

In various embodiments, the polyolefin may have a melt flow rate of about 5 g/10 min to about 100 g/10 min, optionally of about 10 g/10 min to about 90 g/10 min, optionally of about 15 g/10 min to about 80 g/10 min, optionally of about 20 g/10 min to about 70 g/10 min, optionally of about 25 g/10 min to about 60 g/10 min, optionally of about 30 g/10 min to about 80 g/10 min, optionally of about 20 g/10 min to about 50 g/10 min, etc., whereby the melt flow rate may be measured at a temperature of 230° C. at a weight of 2.16 kg. Such ranges of melt flow rate are advantageously suitable for further processing (e.g., injection, pultrusion, lamination) of the polyolefin composite.

According to various embodiments, the polyolefin may be present in a weight percentage range of about 30 wt % to about 95 wt %, or of about 40 wt % to about 95 wt %, or of about 50 wt % to about 95 wt %, or of about 50 wt % to about 90 wt %, or of about 50 wt % to about 80 wt %, or of about 50 wt % to about 70 wt %, etc., based on the total weight of the polyolefin composite.

Since the polyolefin is unsubstituted, it may be substantially non-polar or non-polar. As most filler materials are of a polar nature, it may be difficult to achieve good interaction between the matrix components, especially the non-polar polyolefin, and the filler.

The present disclosure addresses such a limitation on one hand by including a polymer, defined herein as a polymer having a moiety grafted thereon, to the matrix. Advantageously, due to the presence of a moiety grafted on the polymer, interactions with the polyolefin, the polymerisable linker and the filler are enhanced, thereby resulting in improved strength and better dispersion of the filler in the matrix of the polyolefin composite. Further advantageously, the polymer having a moiety grafted thereon may have a substantially non-polar polymer backbone and a substantially polar moiety being grafted therein. Hence, it can act as a compatibilizer to enhance polar and non-polar interactions between the polyolefin and the remaining more polar components within the matrix, in particular the polymerisable linker.

In certain embodiments, the polymer having a moiety grafted thereon may be a further polyolefin having a moiety grafted thereon. Advantageously, when the polymer of the polymer having a moiety grafted thereon is a further polyolefin, the hydrophobic interaction between the polyolefin and the further polyolefin having a moiety grafted thereon may be particularly stronger, since both the polyolefin and the further polyolefin can have approximately equal polarity. The stronger hydrophobic interaction may result in an even stronger adherence of the two materials via secondary interactions.

In certain embodiments, the further polyolefin may be selected from the group consisting of a polymer or a random copolymer or a block copolymer of a $C_{2-20}$alkylene, a $C_{4-20}$alkyldiene, a $C_{6-20}$alkyltriene, a $C_{3-20}$cycloalkylene, a $C_{4-20}$cycloalkyldiene, a $C_{5-20}$cycloalkyltriene, a $C_{8-20}$phenylalkylene, and a combination thereof. In various embodiments, the further polyolefin may be selected from a polymer or a random copolymer or a block copolymer of ethylene, propylene, 1-pentene, 1-butene, 4-methyl-1-pentene, 1-hexene, 1-octene, 1-decene, styrene, ethylidene norbornene, 1,4-hexadiene, 1,5-hexadiene, 1,7-octadiene, 1,9-decadiene, dicyclopentadiene and ethylene-propylene-diene monomer.

In certain embodiments, the further polyolefin may be a polypropylene. Advantageously, when the polyolefin and the further polyolefin are both polypropylene, the hydrophobic interaction between the polypropylene and the further polypropylene having a moiety grafted thereon may be particularly stronger, since both the polypropylene and the further polypropylene can have approximately equal polarity. This stronger hydrophobic interaction may result in an even stronger adherence of the two materials via secondary interactions.

According to various embodiments, the polymer having a moiety grafted thereon is present in a weight percentage range of up to about 50 wt %, or between about 0.1 wt % and about 50 wt %, or between about 0.001 wt % and about 30 wt %, or between about 0.1 wt % and about 40 wt %, or between about 0.1 wt % and about 20 wt %, or up to about 10 wt %, or between about 0.1 wt % and about 10 wt %, or between about 3 wt % and about 15 wt %, or between about 4 wt % and about 10 wt %, or of about 5 wt %, or of about 10 wt %, etc., based on the total weight of the polyolefin composite. Such weight percentage ranges of the polymer having a moiety grafted thereon improve reactivity between the polymer having a moiety grafted thereon and the polymerisable linker.

According to various embodiments, the moiety grafted on the polymer may comprise a —COO— group, which forms the chemical bond with the polymerizable linker. Such a functional group may be present, for example, in an ester, an anhydride, and a lactone. A —COO— group generally refers to a carbon atom with a double bond to one oxygen atom and a single bond to a second oxygen atom. Such a functionality may be the result of various chemical reactions, for example, of an esterification of an acid, a re-esterification of a previous ester, or an opening of an anhydride with an epoxide to form an ester bond.

The moiety comprising the —COO— group of the polymer may be derived from an anhydride. Accordingly, a precursor for the polymer having a moiety grafted thereon may be an anhydride-grafted polymer. Accordingly, in some embodiments, the moiety comprising the —COO— group may be an anhydride selected from the group consisting of maleic anhydride, succinic anhydride, citraconic anhydride, endo-bi-cyclo[2,2,1]-1,4,5,6,7,7-hexa-chloro-5heptene-2,3-dicarboxylic acid anhydride, endo-bi-cyclo[2,2,1]-5-heptene-2,3-dicarboxylic acid anhydride, cis-4-cyclohexene-1, 2-dicarboxylic acid anhydride, and a combination thereof. As one example, the moiety comprising the —COO— group may be derived from maleic anhydride. Accordingly, in one non-limiting example, the polymer having a moiety grafted thereon may be maleic-anhydride-grafted polypropylene.

According to various embodiments, the polymer having a moiety grafted thereon may further comprise a functional group selected from the group consisting of a hydroxyl, a carboxylic acid, a carboxylate, methyl acrylate, methyl methacrylate, ethyl acrylate, ethyl methacrylate, butyl acrylate, butyl methacrylate, maleate monoester, maleate diester, and a combination thereof.

The polyolefin composite further comprises a polymerisable linker. "Polymerisable linker", in that context, refers to a monomer, oligomer or polymer, or any combination thereof, that further comprises a functionality that is covalently bonded to the polymer having a moiety grafted thereon. Advantageously, the polymerisable linker may have a substantially polar chemical nature, which creates a strong hydrophilic interaction with the filler (due to the filler's high polarity). This, in turn, may result in a stronger adherence of the two materials. More advantageously, due to the covalent bond with the polymer having a moiety grafted thereon, the polymerisable linker acts as a linking element, linking the polymer having a moiety grafted thereon, and thereby also the polyolefin, to the filler to be well dispersed within the matrix. The polar chemical nature of the polymerisable linker may be due to polar components of polymerisable linker, such as ether bonds, phenyl rings, or a combination thereof.

According to various embodiments, the polymerisable linker may be a polymerisable epoxide linker. "Polymerisable epoxide linker", in that context, refers to a monomer, oligomer or polymer, or any combination thereof, wherein the functionality that is covalently bonded to the polymer having a moiety grafted thereon is derived from an epoxide. Accordingly, an epoxide may have undergone a ring-opening reaction for forming the polymerisable epoxide linker.

According to various embodiments, the polymerisable linker may be derived from a polymerisable resin, optionally selected from the group consisting of an epoxy-containing monomer, an epoxy-containing oligomer, an epoxy-containing polymer and a combination thereof.

According to various embodiments, the polymerisable resin may be selected from the group consisting of bisphenol A epoxy resin, bisphenol S epoxy resin, bisphenol K epoxy resin, bisphenol F epoxy resin, phenolic novolak epoxy resin, cresol novolak epoxy resin, acyclic epoxy resin, heterocyclic epoxy resin, hydrogenated bisphenol A epoxy resin, aliphatic epoxy resin, and a combination thereof.

According to various embodiments, the polymerisable resin may be obtained by a reaction between an aromatic, aliphatic or alicyclic carboxylic acid and an epoxide-containing precursor.

According to various embodiments, the polymerisable resin may be selected from a glycidyl ether epoxy resin which is obtained by a reaction between ortho-allyl phenolic novolak and an epoxide-containing precursor, or by a reaction between a diallyl bisphenol compound having an allyl group in the ortho position of bisphenol A with respect to the hydroxyl group and an epoxide-containing precursor, or by a reaction between trishydroxylmethane and an epoxide-containing precursor.

According to various embodiments, the polymerisable resin may be obtained by a reaction between a phenol derivative and an epoxide-containing precursor, wherein the phenol derivative may be selected from the group consisting of bisphenol, resorcinol, dihydroxynaphthalene, trihydroxynaphthalene, dihydroxybiphenylfluorene, tetrakishydroxphenlylethane, novolaks, a condensate of dicyclopentadiene, phenol, and a combination thereof.

According to various embodiments, the polymerisable resin may be obtained by a reaction between an amine and an epoxide-containing precursor, wherein the amine may be selected from the group consisting of tetraglycidyldiaminodiphenylmethane, aminophenol, aminocresol, xylenediamine, and a combination thereof. According to various embodiments, the epoxide-containing precursor may be selected from the group consisting of epichlorohydrin, ethylene oxide, propylene oxide, styrene oxide, cyclohexene oxide, phenyl glycidyl ether, and a combination thereof.

According to various embodiments, the polymerisable resin may comprise a spiro ring.

According to various embodiments, the polymerisable linker may be present in a weight percentage range of up to about 50 wt %, or between about 0.1 wt % and about 50 wt %, or of up to about 10 wt %, or between about 0.1 wt % and about 10 wt %, etc., based on the total weight of the polyolefin composite.

According to various embodiments, the chemical bond may be an ester bond. The ester bond may be formed, for example, by a reaction between an anhydride and an epoxide, or between an acid and an alcohol, or, for example, between a different ester and an alcohol.

A filler is dispersed in the matrix. The term "filler" according to the present disclosure refers to any material that may be used to reinforce the polyolefin composite and having a maximal dimension of about 0.1 μm to about 10,000 μm. By the term "maximal dimension", it refers to a size of the filler, as measured by its largest dimension in any direction. In various embodiments, the filler exists in discrete form, and is dispersed in the matrix. In various embodiments, the filler may have a size of about 0.1 μm to about 1000 μm, or about 0.1 μm to about 800 μm, or about 0.1 μm to about 500 μm, or about 0.1 μm to about 100 μm, or about 1 μm to about 1000 μm, or about 1 μm to about 100 μm, or about 100 μm to about 800 μm, or about 200 μm to about 700 μm, or about 300 μm, or about 650 μm, etc. Such sizes of the filler may be used to influence the mechanical properties of the polyolefin composite.

The filler may be present in a weight percentage range of up to about 90 wt %, up to about 70 wt %, up to about 50 wt %, up to about 30 wt %, up to about 20 wt %, up to about 10 wt %, or between about 0.1 wt % and about 90 wt %, or between about 1 wt % to about 70 wt %, or between about 5 wt % to about 30 wt %, or between about 10 wt % to about 20 wt %, or between about 10 wt % to about 30 wt %, or between about 10 wt % to about 50 wt %, or between about 1 wt % and about 60 wt %, or between about 0.1 wt % and about 40 wt %, or between about 0.1 wt % and about 30 wt %, or between about 5 wt % and about 10 wt %, etc., based on the total weight of the polyolefin composite. The weight percentage range of the filler may be used to influence the mechanical properties of the polyolefin composite.

According to certain embodiments, a material of the filler may be selected from the group consisting of a microfiller, a highly dispersed nanofiller, and a combination thereof. The micro filler may be selected from the group consisting of clay, glass, carbon, cellulose, and a combination thereof.

In certain embodiments, the material of the micro filler may be glass. The micro filler may be present as glass roving, glass chopped strand, glass milled fiber, or a combination thereof.

In certain embodiments, a material of the highly dispersed nanofiller may be clay. In particular, the material of the highly dispersed nanofiller may be selected from the group consisting of inorganic silicate, alumino silicate, pellet-like metal oxide and hydroxide, anionic and cationic layered metal oxide and hydroxide, montmorillonite (MMT), kaolinite, dickite, halloysite, and nacrite, nontronite, beidellite, saponite, illite, biotite, lepidolite, phlogopite, clintonite, sepiolite, zinnwaldite, phengite, mica, layered metal oxide, layered metal hydroxide, attapulgite (AT), and a combination thereof.

In certain embodiments, the inorganic silicate may be calcium silicate.

The clay may comprise layered and/or pellet-like metal oxide composed of at least one oxygen atom and at least one metal. The layered and/or pellet-like metal oxide may be selected from the group consisting of $SiO_2$, $TiO_2$, ZnO, CaO, $Al_2O_3$, $Fe_2O_3$, and a combination thereof.

The filler may be surface-treated with an organosilane. Advantageously, by surface-treating the filler with an organosilane, hydrogen bonding and/or a covalent bond between the filler and the polymerisable linker may be facilitated. On one hand, modification of the filler with an organosilane may render the surface of the filler more hydrophobic, thereby enhancing interaction with the components of the matrix and improving the affinity for the polyolefin comprised in the matrix. Alternatively or additionally, surface treatment with an organosilane may be used to covalently bond the surface-treated filler with the polymeri sable linker. In the event the organosilane is present and linked to the polymerisable linker covalently, a "covalent bridge" may be formed stretching from the filler via the polymerisable linker to the polymer having a moiety grafted thereon, thereby further mechanically enhancing the interface between the filler and the matrix, resulting in a higher toughness.

The organosilane may comprise an active functional group selected from the group consisting of octyl, amine, vinyl, hydroxyl, thiol, and a combination thereof. The organosilane may be selected from the group consisting of aminopropyltrimethoxysilane, γ-aminopropylmethyldimethoxysilane, γ-aminopropyltriethoxysilane, γ-aminopropylmethyldiethoxysilane, γ-(N,N-dimethyl)aminopropyltrimethoxysilane, γ-(N,N-diethyl)aminopropyltrimethoxysilane, γ-(N,N-dibutyl)aminopropyltrimethoxysilane, γ-(N,N-dimethyl)aminopropyltriethoxysilane, γ-(N,N-diethyl)aminopropyltriethoxysilane, γ-(N,N-dibutyl)aminopropyltriethoxysilane, γ-(N-methyl)aminopropyltriethoxysilane, γ-(N-ethyl)aminopropyltriethoxysilane, γ-(N,N-dimethyl)aminopropylmethyldimethoxysilane, γ-(N,N-diethyl)aminopropylmethyldimethoxysilane, γ-(N,N-dibutyl)aminopropylmethyldimethoxysilane, γ-(N-methyl)aminopropylmethyldimethoxysilane, and a combination thereof.

According to various embodiments, the organosilane may be present in a weight percentage range of about 0.1 wt % to about 5 wt %, or about 0.2 wt % to about 4 wt %, or about 0.3 wt % to about 3 wt %, or about 0.5 wt % to about 2 wt %, etc., based on the weight of the filler.

In certain embodiments, the polyolefin composite may further comprise a stabilizer selected from the group consisting of an antioxidant, an ultraviolet ray absorber, and a combination thereof. The stabilizer may comprise a hindered phenol, a phosphite, a thioether, a benzophenone, a benzotriazole, and a combination thereof. The antioxidant may be present in a weight percentage range of about 0.01 wt % to about 1.0 wt %, or of about 0.05 wt % to about 0.9 wt %, or of about 0.1 wt % to about 0.8 wt %, or of about 0.2 wt % to about 0.6 wt %, etc., based on the total weight of the polyolefin composite. Such weight percentage ranges advantageously reduce degradation of the polymer composite during processing.

The polyolefin composite may further comprise additives selected from the group consisting of a slipping agent, an antistatic agent, a pigment, and a combination thereof. The pigment may be selected from an inorganic pigment, an organic pigment or a combination thereof.

The polyolefin composite may further comprise a styrene-based polymer. The styrene-based polymer may also be termed as a minor phase polymer resin. The styrene-based polymer may be selected from the group consisting of polystyrene and styrene-acrylonitrile resin, and a combination thereof.

In a second aspect, there is provided a method of providing a polyolefin composite comprising a matrix comprising a polyolefin, a polymer having a moiety grafted thereon, and a polymerisable linker, wherein the moiety grafted on the polymer is covalently bonded to the polymerisable linker via a chemical bond, and a filler disposed within the matrix. The method may comprise (i) mixing a polyolefin, an anhydride-grafted polymer, a polymerisable resin and a filler; (ii) melting the mixture of step (i); and (iii) kneading the mixture of step (ii). Embodiments and advantages described for the polyolefin composite of the first aspect can be analogously valid for the method of the second aspect, and vice versa. As the various embodiments and advantages have already been described above and examples demonstrated herein, they shall not be iterated for brevity where possible.

The mixing step i) of the method, in which a polyolefin, an anhydride-grafted polymer, a polymerisable resin and a filler are mixed to form a mixture, may comprise mixing the polyolefin, the anhydride-grafted polymer, the polymerisable resin and the filler in a mixer or a drum tumbler.

The melting and kneading steps ii) and iii) mentioned above, in which the mixture of polyolefin, the anhydride-grafted polymer, the polymerisable resin and the filler are melted to form a melted mixture, and kneading of the melted mixture respectively, may comprise physically agitating the mixture in a mixer, at least one roller, a twin extruder, or a combination thereof. Advantageously, melting the mixture of step (i) may comprise formation of the chemical bond between the anhydride that is grafted on the polymer and the polymerisable resin, optionally at a temperature of about 120° C. to about 250° C., or optionally at a temperature of about 120° C. to about 190° C., or optionally at a temperature of about 190° C. to about 250° C., etc. In case the polymerisable resin is added after the melting step, the components may not have sufficient activating energy to engage into a reaction. Accordingly, in those cases no covalent bond may be formed.

Embodiments wherein the polymerisable resin may comprise an epoxide, melting the mixture of step (i) may comprise formation of an ester bond between the anhydride that is grafted on the polymer and the epoxide of the polymerisable resin.

In a third aspect, there is provided a polyolefin composite provided by the method as described above. Embodiments and advantages described for the polyolefin composite of the first aspect and the method of the second aspect can be analogously valid for the polyolefin composite of the third aspect, and vice versa. As the various embodiments and advantages have already been described above and examples demonstrated herein, they shall not be iterated for brevity.

In a fourth aspect, there is provided use of a polyolefin composite as described herein in transportation, infrastructure, consumer goods, and/or construction. The use in transportation may be selected from the group consisting of aerospace, automotive, train, and a combination thereof. The use in infrastructure may be selected from the group consisting of pipe, tank, and a combination thereof. The use in consumer goods may be selected from the group consisting of packaging, sporting goods, electronics, and a combination thereof. Embodiments and advantages described for the polyolefin composite of the first and third aspects and the method of the second aspect can be analogously valid for the use of the polyolefin composite of the fourth aspect, and vice versa. As the various embodiments and advantages have already been described above and examples demonstrated herein, they shall not be iterated for brevity where possible.

The present disclosure relates to polyolefin composites with an improved mechanical property which minimizes the problems mentioned above. The polyolefin composite of the present disclosure is reinforced with fillers, which may chemically bond with one or some of the components of the matrix.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

"About", as used herein, refers to the numerical value it relates to ±10%.

Hereinafter, the present disclosure will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

EXPERIMENTAL SECTION

The polymer composite comprising a matrix comprising a polyolefin, a polymer having a moiety grafted thereon, a polymerisable linker and a filler dispersed in the matrix prepared according to the present disclosure results in a high dispersion of the filler in the matrix and provides good compatibility of the filler with the components of the matrix. This object is achieved via chemical reaction between an anhydride-grafted polymer and a polymerisable resin. The in-situ curing reaction between the anhydride-grafted polymer and the polymerisable resin takes place in the mixer at the typical compounding conditions. The polyolefin composite disclosed in the present disclosure, for example, was prepared within 2 minutes.

In one example of the present disclosure, the polyolefin, MPP, the polymerisable resin and the filler were compounded together by extruder, resulting in a polyolefin composite with improved mechanical property, compared to the mechanical properties from control composites without polymerisable resin addition. This is also different from traditional polymer composites, wherein a polymerisable epoxy resin is only added after melting the remaining components, and which therefore would lack a covalent bond between the maleic anhydride modified polyolefins and the linker.

Materials: The polyolefin usable in the composition of this disclosure includes the wide range of polyolefin i.e., low density polyethylene, linear low density polyethylene, medium and high density polyethylene, polypropylene, poly-1-butene, poly-4-methyl-1-pentene, ethylene-propylene block or random copolymer, ethylene-1-butene copolymer, propylene-1-butene copolymer, and mixtures thereof. These polyolefins preferably have an MFR of 5 to 50 at 230° C., 2.16 kg.

The polar functional group grafted on polyolefin chain includes, for example, acid anhydrides and esters such as maleic anhydride, citraconic anhydride, endo-bi-cyclo[2,2,1]-1,4,5,6,7,7-hexachloro-5 heptene-2,3-dicarboxylic acid anhydride, endo-bi cyclo[2,2,1]-5-heptene-2,3-dicarboxylic acid anhydride,cis-4-cyclohexene-1,2-dicarboxylic acid anhydride, methyl acrylate, methyl methacrylate, ethyl acrylate, ethyl methacrylate, butyl acrylate, butyl methacrylate, and maleate esters (monoester and diester). Preferably, maleic anhydride may be grafted. The modified polyolefins may preferably be added in an amount 0.001 to 30 wt %, preferably 4-10 wt % to the polyolefin mixture.

For macro-sized fillers, the glass fiber used in this disclosure may be glass roving, glass chopped strand, or glass milled fiber which may be commonly used for reinforcement of resin. They may preferably be surface treated with, for instance, an organosilane in order to improve the affinity for the resin, and/or an impact modifier in order to enhance the impact resistance.

The metal oxide nano filler used in this disclosure includes, for example, a natural product such as montmorillonite (MMT), kaolinite, dickite, halloysite, and nacrite, nontronite, beidellite, saponite, illite, biotite, lepidolite, phlogopite, clintonite, sepiolite, zinnwaldite, phengite, mica, layered double hydroxide (LDH), or attapulgite (AT), and/or metal oxide composed of at least one oxygen atom and one other element such as $SiO_2$, $TiO_2$, ZnO, CaO, $Al_2O_3$, $Fe_2O_3$, and/or the mixture thereof.

Methodology: The composition of the disclosure can be prepared by mixing polyolefin, an anhydride-grafted polymer, polymerisable resin and a filler using a Henschel mixer or drum tumbler, and then melting and kneading the mixture using a Banbury mixer, rolls, a twin extruder, or the like. However, this disclosure is not limited to these methods. The composition of this disclosure may be incorporated with stabilizers such as antioxidants and ultraviolet rays absorbers, and additives such as slipping agents, antistatic agents, and pigments. The composition of this disclosure is superior in mold ability and demoldability in injection molding; and it can be also used for extrusion molding.

Characterization: High Resolution Transmission Electron Microscopy (HRTEM) micrographs were taken with a Philips CM300 at 300 kV. The samples with a thickness of approximately 100 nm were microtomed at room temperature using a diamond knife and collected on 200 mesh copper grids.

Field Emission Scanning Electron Microscope (FESEM) micrographs were taken using FESEM, JEOL-6700F conducted in high resolution mode with a large objective aperture at 200 kV.

Mechanical Property: The flexural modulus was determined by 3-point bending test according to the ASTM Standard D 790-96. The injection molded sample has a specimen size of 60×10×1 $mm^3$. The tests were conducted with crosshead speed of 1 mm/min, at a span length of 25.4 mm.

The injection molded sample for tensile test was carried out according to ASTM D 638-03. The Type V dimension was 63.5×3.14×3.2 $mm^3$. The test was carried out using the Instron 5569 Table Universal testing machine at tensile speed of 1 mm/min.

EXAMPLE 1

Polypropylene (SCG Chemicals) was mixed with maleic anhydrous grafted polypropylene (Polyone) with 5%-10% by weight of the total mixture. In addition, The PP compound also contains the long chopped glass fiber with 20%, and the epoxy content about 5-10% by weight of the total mixture.

EXAMPLE 2

Polypropylene (SCG Chemicals) is mixed with maleic anhydrous grafted polypropylene (Polyone) with 5%-10% by weight of the total mixture. In addition, The PP compound also contains modified clay with 5% and the epoxy content about 5%-10% by weight of the total mixture.

Comparative Example 1

Polypropylene (SCG Chemicals) was mixed with maleic anhydrous grafted polypropylene (Polyone) with 5% by weight of the total mixture. In addition, the PP compound also contains the long chopped glass fiber with 20% by weight of the total mixture.

Comparative Example 2

Polypropylene (SCG Chemicals) was mixed with maleic anhydrous grafted polypropylene (Polyone) with 5% by weight of the total mixture. In addition, the PP compound also contains modified clay with 5% by weight of the total mixture.

In one example, the glass fiber was surface-treated with an organosilane. As may be seen in FIG. 1, the organosilane on the surface of glass may bond to the polymerisable linker by hydrogen bonding or covalent bond. The covalent bond is preliminarily proven using IR spectroscopy. The spectrum at the interface area showed several unidentified peaks (i.e., at 984, 1071, 1219, 1535 and 1735), implying the chemical bonds between glass fiber and matrix.

Figure 3A:
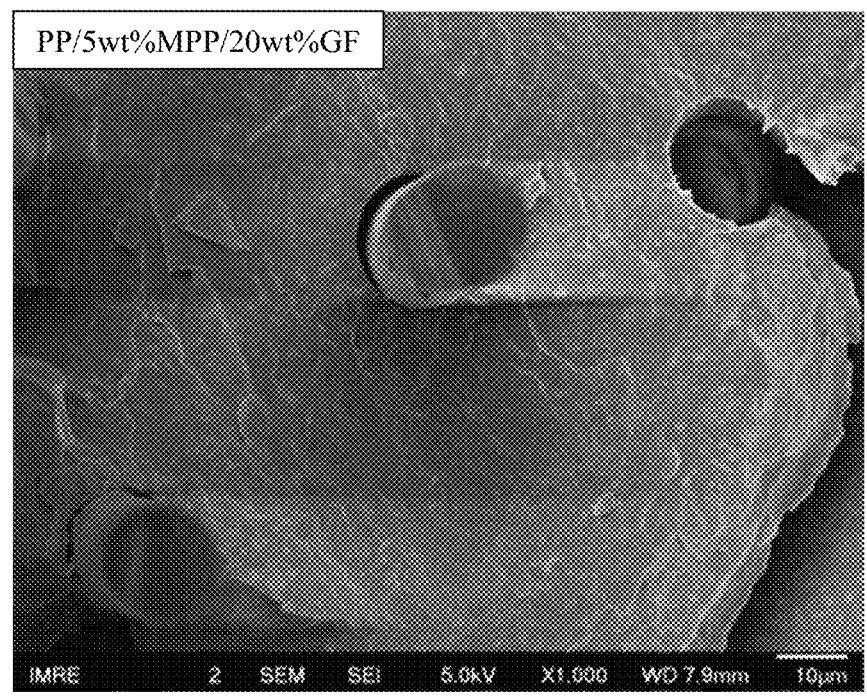
FIG. 3A is a Field Emission Scanning Electron Microscope (FESEM) micrograph showing the morphology of the PP composites after mechanical test as obtained for a Comparative Example comprising 5 wt % MPP and 20 wt % glass fiber (GF) in PP. The scale bar represents a length of 10 μm.
Figure 3B:
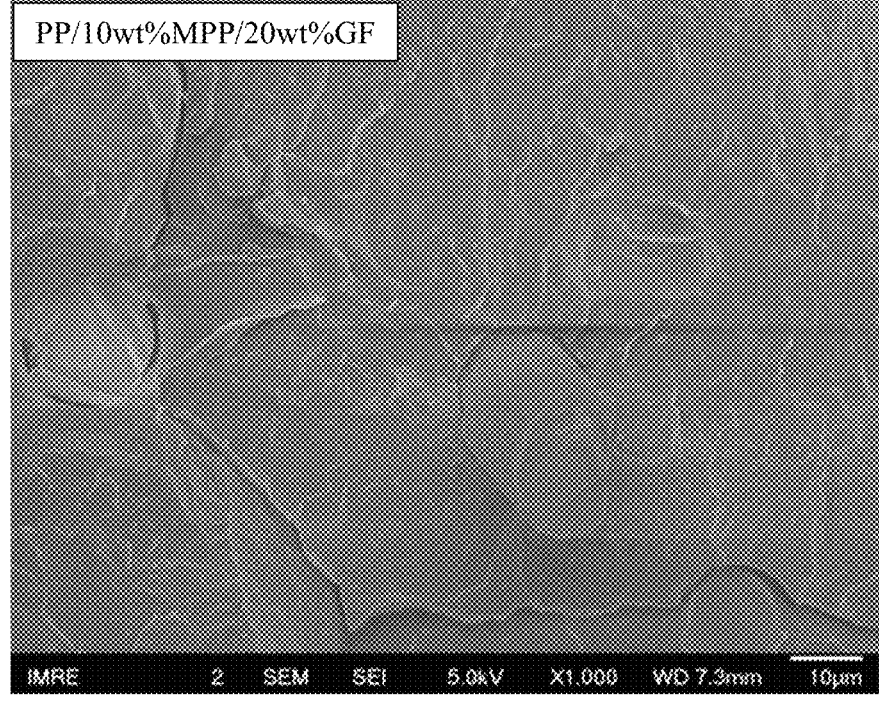
FIG. 3B is a FESEM micrograph showing the morphology of the PP composites after mechanical test as obtained for a Comparative Example comprising 10 wt % MPP and 20 wt % GF in PP. The scale bar represents a length of 10 μm.

The set of results in FIG. 2 shows the mechanical property of of PP and PP composites. Adding glass fiber or modified clay in PP can enhance the mechanical property of PP. Addition of MPP may enhance the interface interaction between the glass filler and the PP matrix, resulting in the improvement of the mechanical performance. However, based on the result found in this study, using only MPP may not be sufficient to enhance the filler-matrix interaction. FIG. 3A and FIG. 3B clearly show the weak interaction between GF and the remaining components of the matrix as shown by the obvious gap between the filler surface and matrix.

It was found that the surface interaction between glass fiber and matrix can be enhanced by using the polymerizable linker as a bridge between MPP and filler. The organosilane on the surface of glass may bond to the polymerizable linker by hydrogen bonding or, in case the polymerisable resin contains an epoxide, by covalent bond.

Figure 3C:
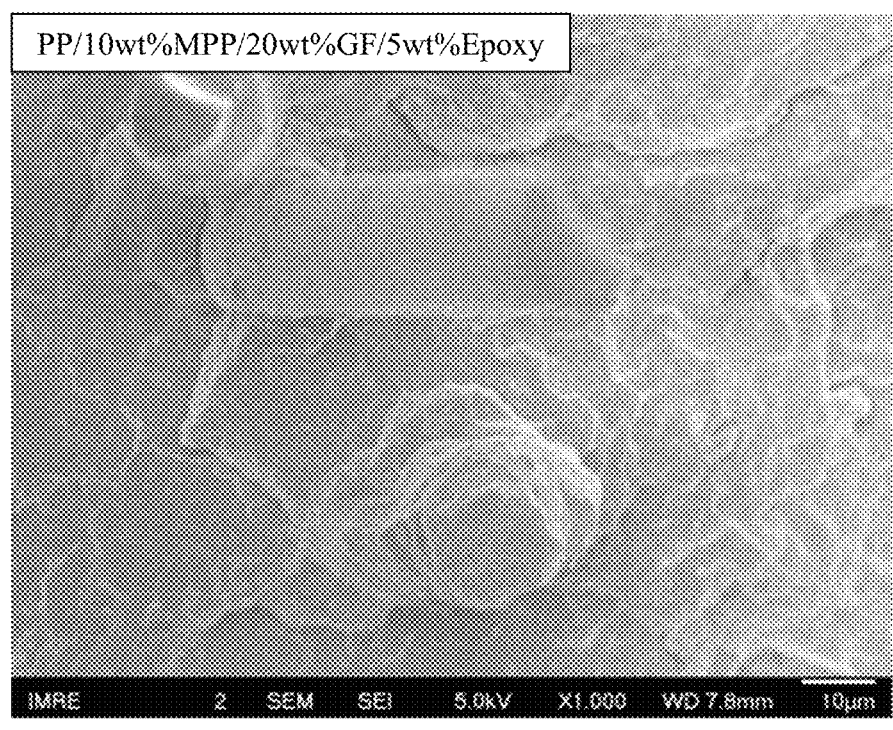
FIG. 3C is a FESEM micrograph showing the morphology of the PP composites after mechanical test as obtained for an Inventive Example comprising 10 wt % MPP, 20 wt % GF and 5 wt % Epoxy in PP. The scale bar represents a length of 10 μm.
Figure 3D:
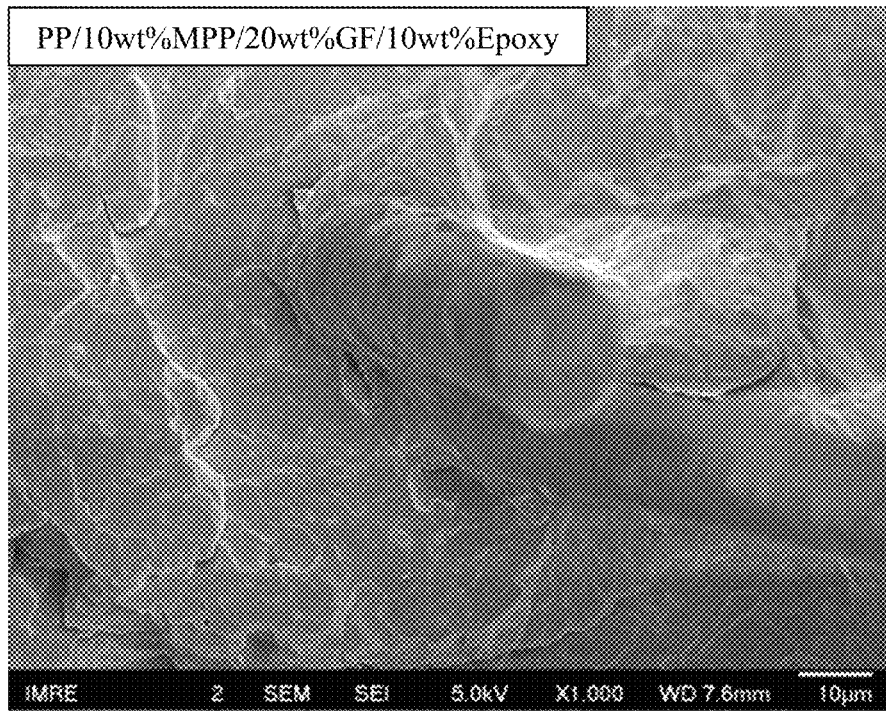
FIG. 3D is a FESEM micrograph showing the morphology of the PP composites after mechanical test as obtained for an Example comprising 10 wt % MPP, 20 wt % GF and 10 wt % Epoxy in PP. The scale bar represents a length of 10 μm.

FIG. 3C and FIG. 3D clearly show the strong interaction between filler and glass fiber surface; the resin coating on the surface of the glass fiber surface and no gap between fiber and the mechanical strength significantly enhanced. The interaction between the fiber and the matrix may be due to the reaction between the epoxide groups and the anhydride group of MPP and the reaction between active functional groups on glass fiber surface and the epoxide groups (*Composite Part A,* 2014, 67, 212). The same phenomenon can be expected for using a nanofiller.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

The invention claimed is:

1. A polyolefin composite comprising
   a matrix comprising a polyolefin, a further polyolefin having a moiety grafted thereon, and a polymerisable epoxide linker, wherein the polymerisable epoxide linker is derived from a polymerisable epoxide resin obtained by a reaction between an amine and an epoxide-containing precursor, wherein the amine is selected from the group consisting of aminophenol, aminocresol, xylenediamine, and a combination thereof, and wherein the moiety grafted on the further polyolefin is covalently bonded to the polymerisable epoxide linker via a chemical bond, and
   a filler disposed within the matrix, wherein the filler is covalently bonded to the polymerisable epoxide linker, and wherein a material of the filler is glass and is surface-treated with an organosilane, thereby enabling the covalent bond between the filler and the polymerisable epoxide linker.

2. The polyolefin composite of claim 1, wherein either one of or both the polyolefin and the further polyolefin are selected from the group consisting of a polymer or a random copolymer or a block copolymer of ethylene, propylene, 1-pentene, 1-butene, 4-methyl-1-pentene, 1-hexene, 1-octene, 1-decene, styrene, ethylidene norbornene, 1,4-hexadiene, 1,5-hexadiene, 1,7-octadiene, 1,9-decadiene, dicyclopentadiene and ethylene-propylene-diene monomer.

3. The polyolefin composite of claim 1, wherein the polyolefin is polyethylene, polypropylene, or polypropylene in combination with an ethylene-α-olefin copolymer.

4. The polyolefin composite of claim 1, wherein the polyolefin has a melt flow rate of about 5 g/10 min to 100 g/10 min at a temperature of 230° C. and at a weight of 2.16 kg.

5. The polyolefin composite of claim 1, wherein the polyolefin is present in a weight percentage range of about 30 wt % to about 95 wt % based on the total weight of the polyolefin composite.

6. The polyolefin composite of claim 1, wherein the further polyolefin is polypropylene.

7. The polyolefin composite of claim 1, wherein the further polyolefin having a moiety grafted thereon is present in a weight percentage range of up to about 50 wt % based on the total weight of the polyolefin composite.

8. The polyolefin composite of claim 1, wherein the moiety grafted on the further polyolefin comprises a —COO— group which forms the chemical bond with the polymerizable epoxide linker.

9. The polyolefin composite of claim 1, wherein the further polyolefin further comprises a group selected from the group consisting of a hydroxyl, a carboxylic acid, a carboxylate, methyl acrylate, methyl methacrylate, ethyl acrylate, ethyl methacrylate, butyl acrylate, butyl methacrylate, maleate monoester, maleate diester, and a combination thereof.

10. The polyolefin composite of claim 1, wherein the polymerisable epoxide linker is present in a weight percentage range of up to about 50 wt % based on the total weight of the polyolefin composite.

11. The polyolefin composite of claim 1, wherein the chemical bond is an ester bond.

12. The polyolefin composite of claim 1, wherein a material of the filler further comprises clay, carbon, cellulose, or a combination thereof.

13. The polyolefin composite of claim 1, wherein a material of the filler further comprises clay and is selected from the group consisting of inorganic silicate, alumino silicate, pellet-like metal oxide and hydroxide, anionic and cationic layered metal oxide and hydroxide, montmorillonite (MMT), kaolinite, dickite, halloysite, and nacrite, nontronite, beidellite, saponite, illite, biotite, lepidolite, phlogopite, clintonite, sepiolite, zinnwaldite, phengite, mica, layered metal oxide, layered metal hydroxide, attapulgite (AT), and a combination thereof.

14. The polyolefin composite of claim 13, wherein the clay comprises layered and/or pellet-like metal oxide.

15. The polyolefin composite of claim 1, further comprising a stabilizer selected from the group consisting of an antioxidant, an ultraviolet ray absorber, and a combination thereof.

16. The polyolefin composite of claim 1, further comprising a styrene-based polymer.

17. A method of providing the polyolefin composite according to claim 1, the method comprising
   (i) mixing a polyolefin, a further polyolefin having a moiety grafted thereon, a polymerisable epoxide linker and a filler;
   (ii) melting the mixture of step (I); and
   (iii) kneading the mixture of step (ii).

18. The method of claim 17, wherein melting the mixture of step (i) comprises formation of an ester bond between the moiety grafted on the further polyolefin and the polymerisable epoxide linker at a temperature of about 120° C. to about 250° C.

* * * * *